US008905183B2

(12) United States Patent
Warner et al.

(10) Patent No.: US 8,905,183 B2
(45) Date of Patent: Dec. 9, 2014

(54) CONTOURED BACKREST WITH INTEGRATED CONTROL MODULE FOR USE WITH A MATERIAL HANDLING VEHICLE

(71) Applicants: Brian M. Warner, Oxford, NY (US);
Gregory W. Smiley, Greene, NY (US);
Thomas W. Confer, Chenango Forks, NY (US)

(72) Inventors: Brian M. Warner, Oxford, NY (US);
Gregory W. Smiley, Greene, NY (US);
Thomas W. Confer, Chenango Forks, NY (US)

(73) Assignee: The Raymond Corporation, Greene, NY (US)

( * ) Notice: Subject to any disclaimer, the term of this patent is extended or adjusted under 35 U.S.C. 154(b) by 23 days.

(21) Appl. No.: 13/827,152

(22) Filed: Mar. 14, 2013

(65) Prior Publication Data
US 2014/0262592 A1 Sep. 18, 2014

(51) Int. Cl.
B60K 26/00 (2006.01)
B60R 11/00 (2006.01)
B60N 2/38 (2006.01)

(52) U.S. Cl.
CPC .. *B60R 11/00* (2013.01); *B60N 2/38* (2013.01)
USPC ........................................................ 180/315

(58) Field of Classification Search
USPC ................. 180/89-12, 89.13, 315, 318, 333, 180/89.12; 297/452.29, 452.31–452.36
See application file for complete search history.

(56) References Cited

U.S. PATENT DOCUMENTS

| | | | |
|---|---|---|---|
| 3,019,050 A * | 1/1962 | Spielman | 297/217.3 |
| 4,287,966 A | 9/1981 | Frees | |
| 4,347,416 A | 8/1982 | Ogden | |
| 5,430,266 A | 7/1995 | Austin, Jr. et al. | |
| D384,478 S | 9/1997 | Prehn et al. | |
| 6,189,964 B1 | 2/2001 | Henshaw et al. | |
| 6,226,582 B1 | 5/2001 | Adsett et al. | |
| D445,553 S | 7/2001 | Pulskamp et al. | |
| D450,169 S | 11/2001 | Pulskamp et al. | |
| 6,382,359 B1 | 5/2002 | Lohmann | |
| 6,698,832 B2 * | 3/2004 | Boudinot | 297/217.4 |
| 6,926,329 B2 * | 8/2005 | Neumann et al. | 296/24.34 |
| 7,146,701 B2 | 12/2006 | Mahoney et al. | |
| 7,151,237 B2 | 12/2006 | Mahoney et al. | |
| 7,314,116 B2 | 1/2008 | David et al. | |
| D562,525 S | 2/2008 | Graf et al. | |
| D563,074 S | 2/2008 | Standke | |
| 7,383,915 B2 | 6/2008 | David et al. | |
| 7,641,020 B2 | 1/2010 | Lohmann | |
| 7,793,979 B2 | 9/2010 | Kraimer et al. | |

(Continued)

OTHER PUBLICATIONS

The Raymond Corporation, PowerSteer Brochure, 2010, 2 pages.

(Continued)

*Primary Examiner* — Paul N Dickson
*Assistant Examiner* — Robert A Coker
(74) *Attorney, Agent, or Firm* — Quarles & Brady LLP (57) ABSTRACT

A contoured backrest for a material handling vehicle includes a support surface for supporting a vehicle operator, a rear surface facing away from the support surface, a top barrier ridge joining the support surface and the rear surface, a control module support extending upwardly from the rear surface and above the top barrier ridge, and a pocket formed in the control module support for receiving a control module. At least a portion of the pocket extends above the top barrier ridge to inhibit, restrict, and/or reduce inadvertent engagement with the control module as an operator enters, exits, and generally operates the material handling vehicle.

17 Claims, 7 Drawing Sheets

(56) References Cited

U.S. PATENT DOCUMENTS

| | | |
|---|---|---|
| 8,193,903 B2 | 6/2012 | Kraimer et al. |
| 8,251,445 B2 * | 8/2012 | Pos .......................... 297/217.1 |
| 8,336,959 B2 * | 12/2012 | Cottrell et al. ............. 297/217.3 |
| 8,392,049 B2 * | 3/2013 | Goodwin et al. ............ 701/29.1 |
| 2003/0025367 A1 * | 2/2003 | Boudinot .................... 297/217.3 |
| 2005/0006918 A1 * | 1/2005 | Neumann et al. .......... 296/24.34 |
| 2005/0279561 A1 * | 12/2005 | Shearer et al. ................. 180/333 |
| 2006/0137931 A1 * | 6/2006 | Berg et al. ..................... 180/333 |
| 2007/0102972 A1 * | 5/2007 | Dinkel et al. ............. 297/217.3 |
| 2009/0200116 A1 | 8/2009 | Wiggins et al. |

OTHER PUBLICATIONS

BT Raymond, Inc., Drawing No. 1066671, Control Handle, 2 pages.
The Raymond Corporation, Center Rider Pallet Truck Model 8510 Brochure, 2012, 2 pages.

* cited by examiner

CONTOURED BACKREST WITH INTEGRATED CONTROL MODULE FOR USE WITH A MATERIAL HANDLING VEHICLE

CROSS REFERENCE TO RELATED APPLICATION

Not Applicable

STATEMENT REGARDING FEDERALLY SPONSORED RESEARCH

Not Applicable

BACKGROUND OF THE INVENTION

The present invention relates to contoured backrests for use with a material handling vehicle, and more particularly to a contoured backrest with an integrated control module that incorporates a barrier ridge to inhibit inadvertent actuation of the control module.

Control modules are often employed to provide an interface allowing a user to manipulate functions that are triggered by actuating buttons on the control module. For instance, material handling vehicles, such as those manufactured by The Raymond Corporation of Greene, New York, incorporate control modules that can be engaged by an operator to trigger functions including raising and lowering forks, and sounding the horn. A myriad of considerations go into the design of control modules including providing easy access to and operation of the control module by operators of varying size and dexterity, and reducing the potential for inadvertent actuation of buttons on such control modules.

In light of at least the above design considerations and the challenges presented by them, a need exists for an improved backrest for a material handling vehicle providing enhancements including a barrier ridge that reduces the potential for inadvertent actuation of an integrated control module.

SUMMARY OF THE INVENTION

In one aspect, a contoured backrest for a material handling vehicle comprises a support surface for supporting a vehicle operator, a rear surface facing away from the support surface, a top barrier ridge joining the support surface and the rear surface, a control module support extending upwardly from the rear surface and above the top barrier ridge, and a pocket formed in the control module support for receiving a control module. At least a portion of the pocket extends above the top barrier ridge.

In another aspect, a contoured backrest having an integrated control module for use in a material handling vehicle comprises a body and a support portion proximate a first side of the body. A control module support extends from an upper end of the body away from the first side and is configured to house the control module in a pocket formed in the control module support. A barrier ridge is positioned between the support portion and the pocket, wherein at least a portion of the barrier ridge extends beyond an upper edge of the support portion and a lower rim of the pocket.

In yet a further aspect, a material handling vehicle, including a contoured backrest with an integrated control module, comprises a frame and an operator compartment supported on the frame. A steering yoke is supported on the frame near one end of the operator compartment and a generally vertically oriented backrest is supported on the frame near an opposite end of the operator compartment. The backrest has a support surface for supporting a vehicle operator. A control module support extends from the backrest away from the support surface. The control module support has a pocket for housing a control module such that a control surface of the control module is positioned at an angle relative to the support surface. A barrier ridge is positioned between the backrest surface and the control surface such that at least a portion of the barrier ridge extends vertically and overlaps at least a portion of the control surface as viewed perpendicular to the backrest surface to inhibit access to the control surface.

These and still other aspects will be apparent from the description that follows. In the detailed description, preferred example embodiments will be described with reference to the accompanying drawings. These embodiments do not represent the full scope of the concept; rather the concept may be employed in other embodiments. Reference should therefore be made to the claims herein for interpreting the breadth of the invention.

DETAILED DESCRIPTION OF THE PREFERRED EXAMPLE EMBODIMENT

The concepts described below and shown in the accompanying figures are illustrative of an example implementation of the inventive concepts; however, when given the benefit of this disclosure, one skilled in the art will appreciate that the inventive concepts described herein can be modified and incorporated into many other applications. Furthermore, throughout the description terms such as front, back, side, top, bottom, up, down, upper, lower, inner, outer, above, below, and the like are used to describe the relative arrangement and/or operation of various components of the example embodiment; none of these relative terms are to be construed as limiting the construction or alternative arrangements that are within the scope of the claims.

Figure 1:
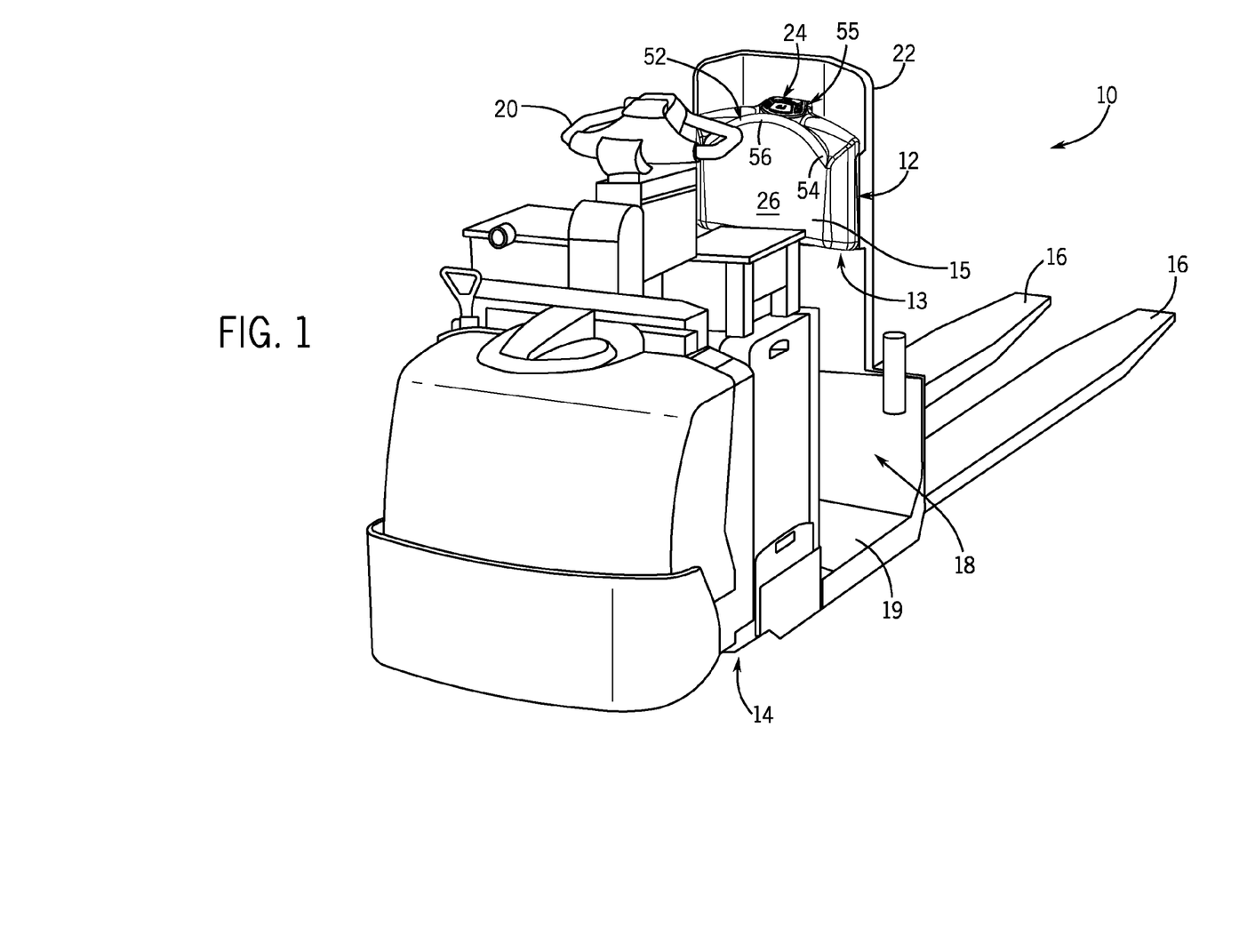
FIG. 1 is an isometric view of an example material handling vehicle incorporating an example contoured backrest.
Figure 2:
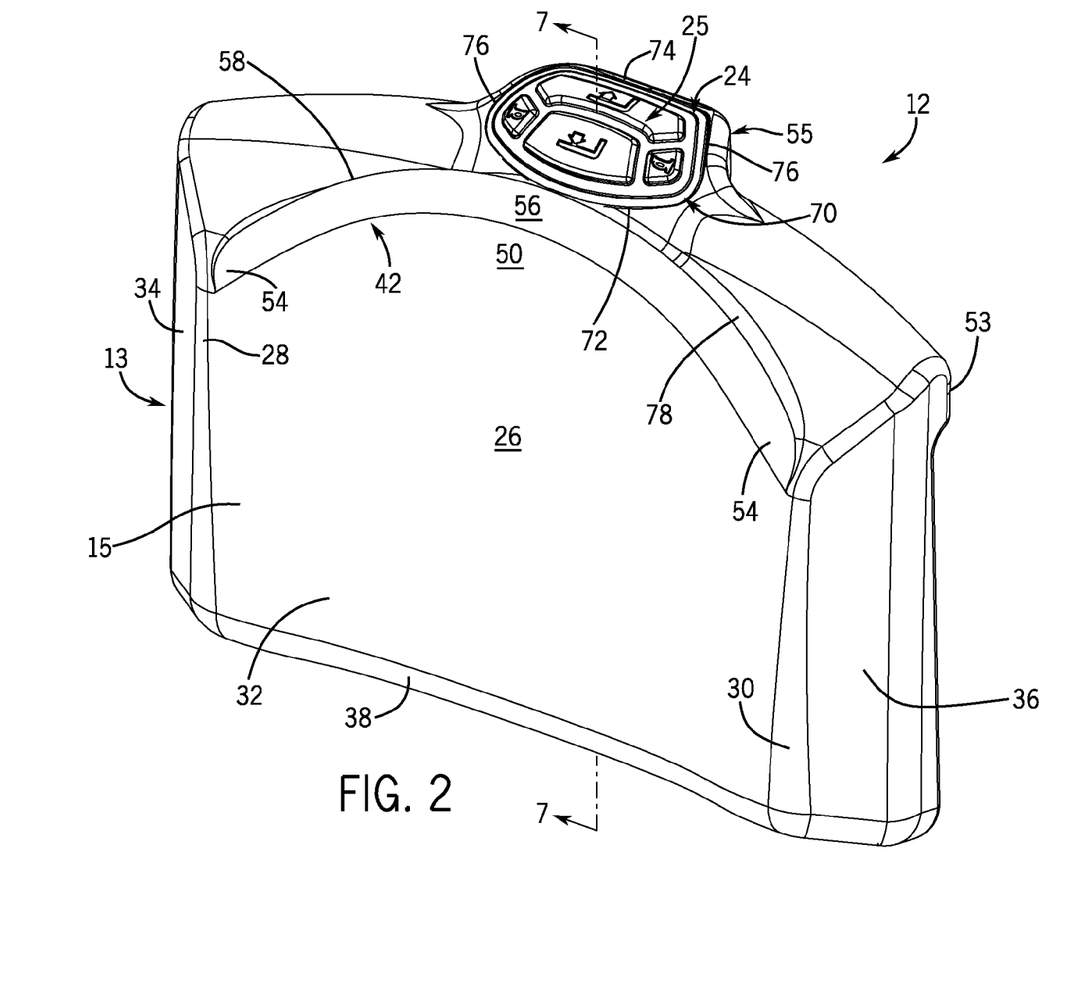
FIG. 2 is a front isometric view of the example contoured backrest shown removed from the example material handling vehicle.

An example material handling vehicle 10 ("vehicle 10") is depicted in FIG. 1, and is configured to include an example contoured backrest 12 ("backrest 12"). The example vehicle 10 that is illustrated is a simplified representation of a central rider pallet truck, such as the Model 8510 manufactured by The Raymond Corporation of Greene, N.Y. One skilled in the art will appreciate that the contoured backrest concept can be adapted for use in a variety of vehicles and configurations. The example vehicle 10 includes a frame 14, which, among other components, supports a traction engine that is operatively coupled to one or more drive wheels (not shown). Two parallel forks 16 for engaging a load extend from the frame 14 and include caster wheels (not shown) to help support loads carried by the forks 16. A generally central operator compartment 18 is defined between a steering yoke 20 at one end of the operator compartment 18 and the backrest 12 at the opposite end of the operator compartment 18. The backrest 12 is shown adjustably mounted adjacent to a load wall 22, such that the vertical position or elevation of the backrest 12 relative to the balance of the vehicle 10 can be adapted to accommodate operators of various proportions. One skilled in the art will appreciate the basic construction and operation of the vehicle 10, with the exception of the backrest 12, adheres to standard practice.

Figure 3:
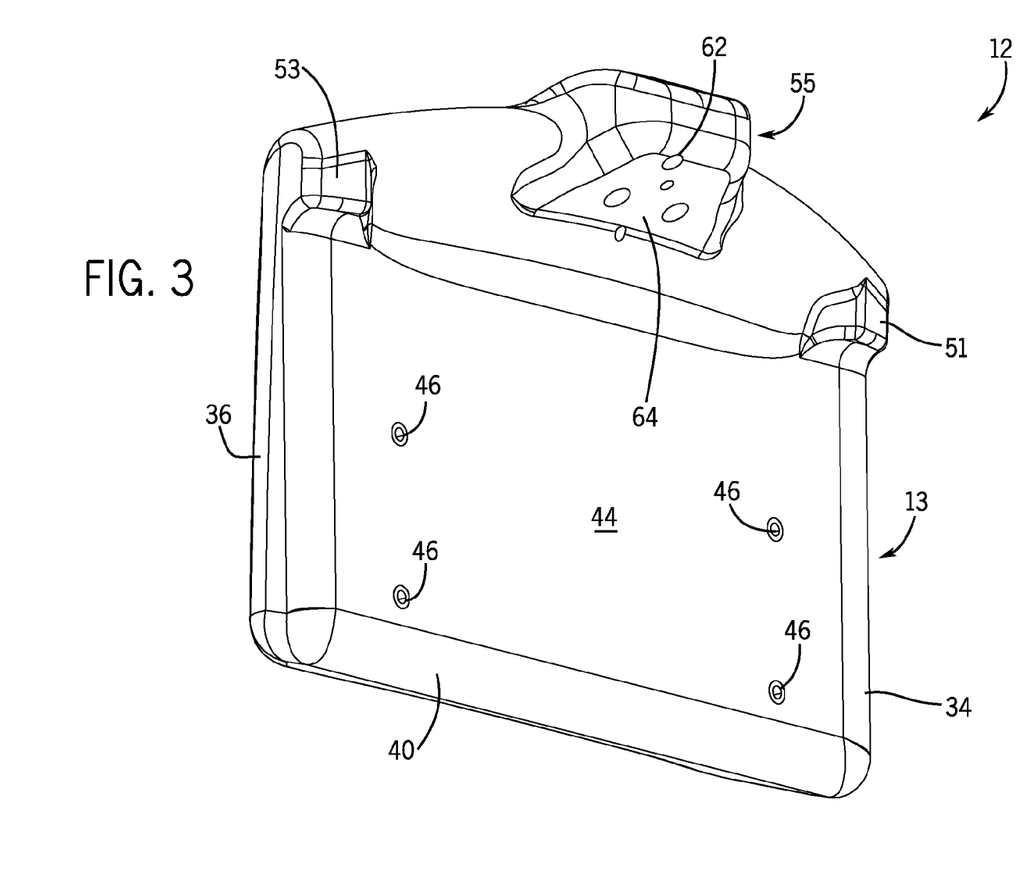
FIG. 3 is a rear isometric view of the example contoured backrest.
Figure 4:
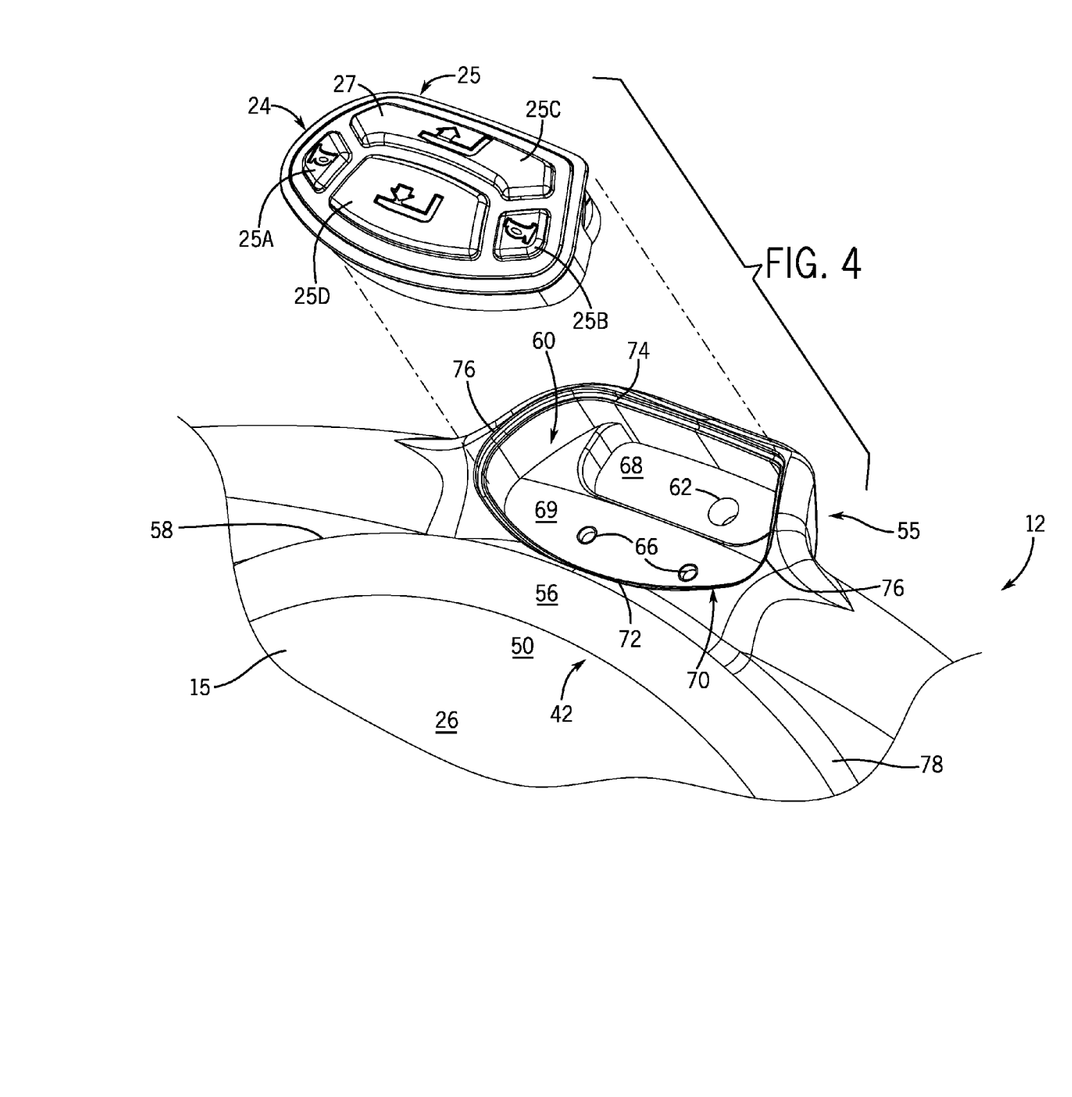
FIG. 4 is a partial exploded front isometric view of the example contoured backrest illustrating an example control module removed from an example control module support.
Figure 5:
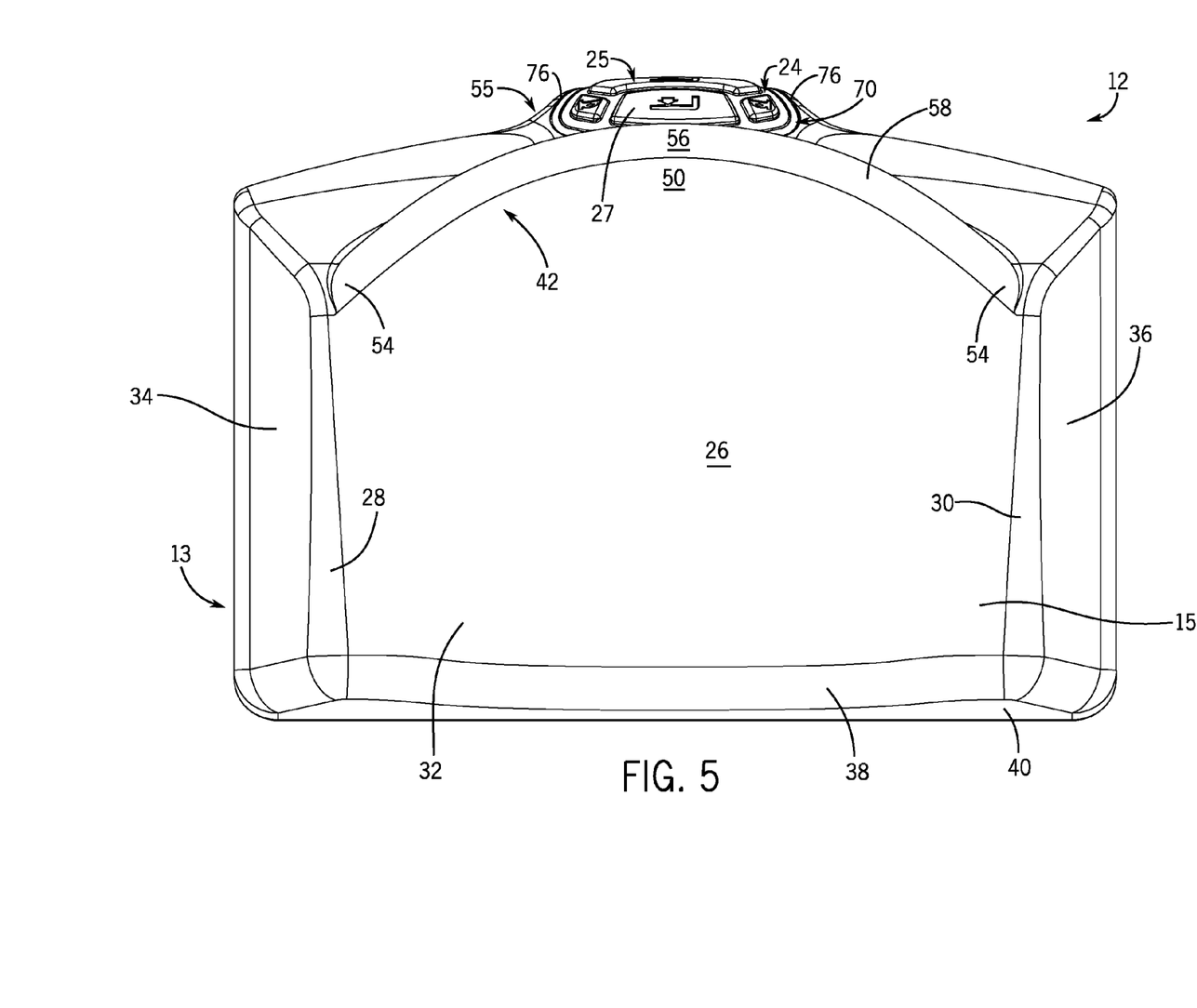
FIG. 5 is a front plan view of the example contoured backrest.
Figure 6:
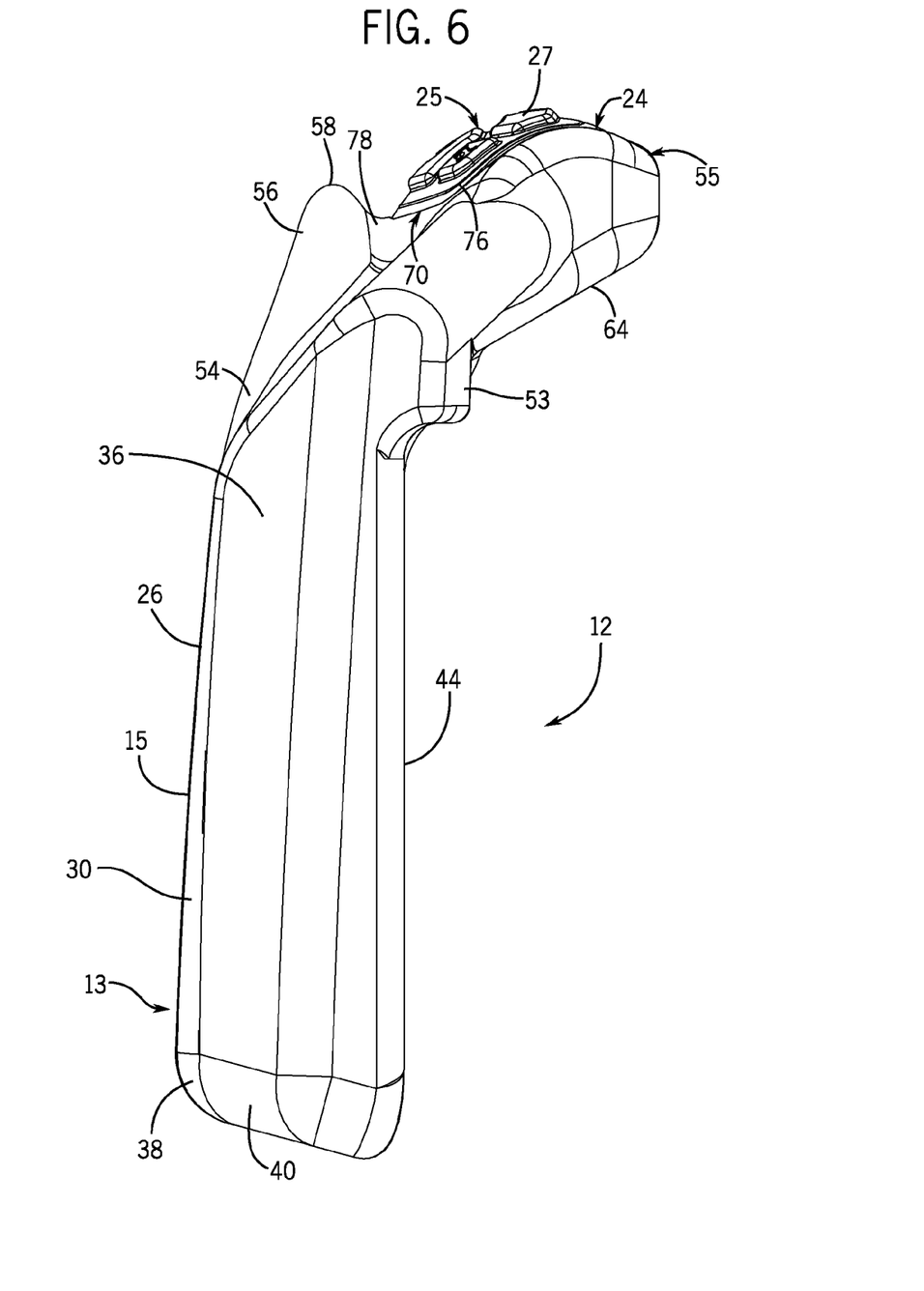
FIG. 6 is a side elevation view of the example contoured backrest.
Figure 7:
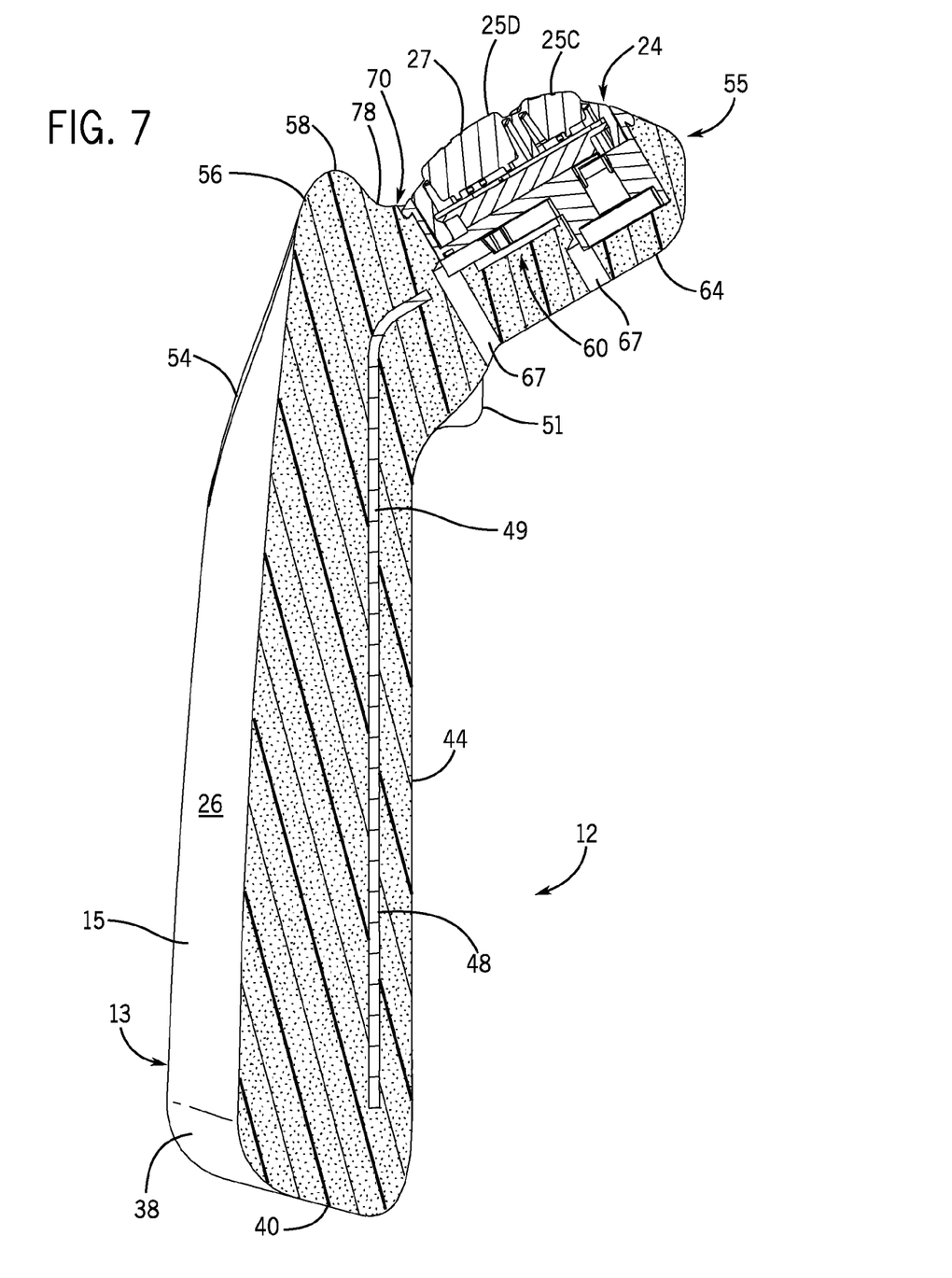
FIG. 7 is a section view along line 7-7 of FIG. 2.

With additional reference to FIGS. 2-7, the backrest 12 is configured to inhibit inadvertent engagement of a control module 24 by an operator entering, leaving, or standing in the operator compartment 18. The example backrest 12 includes a body 13 having a central, support portion 15 with a support surface 26 that is predominately concave and configured to support and engage an operator within the operator compartment 18 (e.g., as an operator leans toward the backrest 12). The support surface 26 generally extends between vertical edges 28, 30 that are rounded between a central portion 32 of the support surface 26 and respective side surfaces 34, 36 of the backrest 12. A generally horizontal lower edge 38 extends between the vertical edges 28, 30 and is also rounded at the intersection of the central portion 32 and a lower face 40. The support surface 26 defines an arcuate horizontal upper edge 42 along the upper boundary of the support surface 26. A rear surface 44 faces opposite and away from the support surface 26. As best shown in FIGS. 3, 6, and 7, the rear surface 44 is generally flat and is oriented vertically when mounted to the balance of the vehicle 10 (i.e., the rear surface 44 is generally perpendicular to a floor 19 (shown in FIG. 1) of the operator compartment 18). Four threaded mounts 46 are also illustrated in FIG. 3 and are used in the example backrest 12 to adjust the vertical position of the backrest 12 when it is mounted to the balance of the vehicle 10. Specifically, the threaded mounts 46 are secured to a reinforcing, generally plate-shaped metallic insert 48 around which the balance of the backrest 12 has been over-molded. An upper portion 49 of the insert 48 is bent to conform to the rearward skew of the rear surface 44. Additionally, a pair of contoured shoulders 51, 53 extend from the rear surface 44 near respective side surfaces 34, 36 of the backrest 12. Parallel mounting slots and holes (not shown) are formed in the load wall 22, which accommodate and allow vertical adjustment of the coupled backrest 12.

An upper portion 50 of the support surface 26 along the arcuate horizontal upper edge 42 is contoured to blend into a top barrier ridge 52 that joins or bridges the support surface 26 and the rear surface 44. The barrier ridge 52 extends laterally between the side surfaces 34, 36 of the backrest 12. The respective ends 54 of the barrier ridge 52 are arranged to be vertically below a central portion 56 of the barrier ridge 52 (best shown in FIG. 5) such that the barrier ridge 52 has an arcuate form factor with downward sloping ends 54.

The relative positioning and the overall form factor of the barrier ridge 52 are configured to provide a physical barrier that inhibits, reduces, or impedes inadvertent actuation of the control module 24 by an operator when entering, leaving, or otherwise within the operator compartment 18. The control module 24 is housed in a control module support 55 that extends upwardly from an upper end of the body 13 proximate the rear surface 44 and away from the support surface 26. The control module support 55 is shown centered relative to the rear surface 44 and terminates in a rounded upper rim 58 above the top barrier ridge 52. As best illustrated in FIGS. 4 and 7, a pocket 60 is formed in the control module support 55 that is configured to receive and house the control module 24.

The pocket 60 also includes a hole or opening 62 to allow cables or wires (not shown) from the control module 24 to pass through a back side 64 of the pocket 60. Additionally, two mounting holes 66 are formed in the pocket 60 such that fasteners (not shown) secure the control module 24 to the control module support 55. The perimeter of the pocket 60 defies a rim 70 with a lower, arcuate portion 72 and an upper, horizontal portion 74 connected by opposite, curved side portions 76. The interior of the pocket 60 defines a stepped configuration with a lower step 68 and an upper step 69 that are keyed to match the form factor of the control module 24. Drain/vent holes 67 are also formed in each of the steps 68, 69 of the pocket 60. When the control module 24 is seated in the pocket 60, various control buttons 25 (a left horn button 25A, a right horn button 25B, a raise fork button 25C, and a lower fork button 25D) of the control module 24 define a generally curved control surface 27 that is positioned and oriented such that an average planar surface of the curved control surface 27 is skewed or angled relative to the support surface 26 of the backrest 12. As illustrated best in FIGS. 6 and 7, the relative configuration of the support surface 26, the barrier ridge 52, and the control module support 55 results in a valley 78 being formed between the barrier ridge 52 and the control module support 55. The valley 78 and the contours of the rounded upper rim 58 provide ergonomic accommodations for an operator's arm (e.g., resting in the valley 78) and hand (e.g., allowing the control surface 27 to be engaged via an operator's thumb while the operator's fingers wrap over and around a portion of the control module support 55), whether the operator is using a right or left arm to engage and operate the control module 24.

With specific reference to FIGS. 5, 6, and 7, the barrier ridge 52 is positioned between the support portion 15 and the control surface 27 of the control module 24 housed in the pocket 60 to inhibit and impede inadvertent actuation of the buttons 25. Specifically, the relative vertical placement of the barrier ridge 52 to the control module 24 results in a configuration that reduces inadvertent engagement by an operator with the control module 24 because, for example, the operator must reach over the barrier ridge 52 to engage the buttons 25. Additionally, when an operator leans against the backrest 12 the barrier ridge 52 hampers access to the buttons, for instance, a walkie-talkie or other tool (e.g., box cutter, screwdriver, etc.) positioned near the operator's waist is impeded and deflected by the barrier ridge 52. In one arrangement, at least a portion of the pocket 60 extends vertically above the barrier ridge 52, such that the control module 24 can be easily accessed when engaged from above the barrier ridge 52. Alternatively, at least a portion of the barrier ridge 52 extends beyond the upper edge 42 of the support portion 15 or support surface 26 and beyond the lower arcuate portion 72 of the rim 70 defined by the pocket 60. The ends 54 of the barrier ridge 52 may be positioned lower than the pocket 60, provided the central portion 56 overlaps at least a portion of the control surface 27 as viewed horizontally (e.g., generally perpendicular to the rear surface 44) in FIG. 5. Stated alternatively, the barrier ridge 52 is positioned between the support surface 26 of the backrest 12 and the control module 24 such that at least a portion of the barrier ridge 52 extends vertically to overlap at least a portion of the control surface 27 as viewed perpendicular to the backrest 12 (e.g., the support surface 26), thereby inhibiting access to the control surface 27 of the control module 24. In some forms, the barrier ridge 52 is sized and located such that the barrier ridge 52 overlaps at least a portion of at least one button 25 on the control surface 27. For example, FIGS. 5, 6, and 7 illustrate the central portion 56 of the barrier ridge 52 extending upward to overlap a portion of the lower fork button 25D on the control surface 27.

Given the benefit provided by this disclosure, one of ordinary skill in the art will appreciate the various modifications and alterations within the scope of the fundamental backrest concept. For instance, while the barrier ridge 52 is illustrated as a curvilinear structure extending generally vertical, the barrier ridge structure may include various disjointed segments of differing heights or may extend in a direction skewed relative to vertical (e.g., toward the steering yoke 20). Additionally, while the body 13 of the backrest 12 is preferably made of a resilient material over-molded about the metallic insert 48, the body 13 may be made of a unitary plastic component with sufficient rigidity to make the use of a metallic insert superfluous. Furthermore, the form factor and features of the control module 24 are for illustrative purposes, such that alternative control modules may be of varying size, shape, and function, and may be integral or separate from the balance of the accompanying backrest.

While there has been shown and described what is at present considered the preferred embodiments, it will be appreciated by those skilled in the art that various changes and modifications can be made without departing from the scope of the invention defined by the following claims (e.g., the relative proportions and dimension of the components can be altered, and, where applicable, various components can be integrally formed or single components can be separated into multiple pieces).

We claim:

1. A contoured backrest for a material handling vehicle, the backrest comprising:
    a support surface for supporting a vehicle operator;
    a rear surface facing away from the support surface;
    a top barrier ridge joining the support surface and the rear surface;
    a control module support extending upwardly from the rear surface and above the top barrier ridge; and
    a pocket formed in the control module support for receiving a control module;
    wherein at least a portion of the pocket extends above the top barrier ridge.

2. The contoured backrest of claim 1, wherein the support surface is concave.

3. The contoured backrest of claim 1, wherein the top barrier ridge extends laterally between sides of the contoured backrest and ends of the top barrier ridge are below a center of the top barrier ridge.

4. The contoured backrest of claim 1, wherein the control module support is centered on the rear surface.

5. The contoured backrest of claim 1, wherein a valley is formed between the top barrier ridge and the control module support.

6. A contoured backrest having an integrated control module for use in a material handling vehicle comprising:
    a body;
    a support portion proximate a first side of the body;
    a control module support extending from an upper end of the body away from the first side and configured to house the control module in a pocket formed in the control module support;
    a barrier ridge positioned between the support portion and the pocket;
    wherein at least a portion of the barrier ridge extends beyond an upper edge of the support portion and a lower rim of the pocket.

7. The contoured backrest of claim 6, wherein the barrier ridge is arcuate.

8. The contoured backrest of claim 6, wherein the body includes a metallic frame over which the support portion, the control module support, and the barrier ridge are formed.

9. The contoured backrest of claim 6, wherein the pocket defines a hole extending completely through the pocket.

10. The contoured backrest of claim 6, wherein the control module support includes a rounded upper rim.

11. A material handling vehicle including a contoured backrest with an integrated control module, the material handling vehicle comprising:
    a frame;
    an operator compartment supported on the frame;
    a steering yoke supported on the frame near one end of the operator compartment;
    a generally vertically oriented backrest supported on the frame near an opposite end of the operator compartment having a support surface for supporting a vehicle operator;
    a control module support extending from the backrest away from the support surface, the control module support having a pocket for housing a control module such that a control surface of the control module is positioned at an angle relative to the support surface; and
    a barrier ridge positioned between the support surface and the control surface such that at least a portion of the barrier ridge extends vertically and overlaps at least a portion of the control surface as viewed perpendicular to the backrest surface to inhibit access to the control surface.

12. The material handling vehicle of claim 11, wherein the barrier ridge is positioned between the steering yoke and the control module.

13. The material handling vehicle of claim 11, wherein the barrier ridge is arcuate such that ends of the barrier ridge are positioned lower than the pocket.

14. The material handling vehicle of claim 11, wherein a valley is formed between the barrier ridge and the control module support.

15. The material handling vehicle of claim 11, wherein the support surface is concave.

16. The material handling vehicle of claim 11, wherein the control module support includes a rounded upper rim.

17. The material handling vehicle of claim 11, wherein the barrier ridge overlaps at least a portion of at least one button on the control surface.

* * * * *